US012710741B2

(12) United States Patent
Young et al.

(10) Patent No.: US 12,710,741 B2
(45) Date of Patent: Aug. 18, 2026

(54) PASSIVE IDENTIFICATION TAG FABRICATION METHODS

(71) Applicant: Pascal Tags Inc., Louisville, KY (US)

(72) Inventors: Brandon Thomas Young, Louisville, KY (US); James E. Abbott, Jr., Albany, OR (US)

(73) Assignee: Pascal Tags Inc., Louisville, KY (US)

( * ) Notice: Subject to any disclaimer, the term of this patent is extended or adjusted under 35 U.S.C. 154(b) by 402 days.

(21) Appl. No.: 18/288,974

(22) PCT Filed: Apr. 30, 2022

(86) PCT No.: PCT/US2022/027167
§ 371 (c)(1),
(2) Date: Oct. 30, 2023

(87) PCT Pub. No.: WO2022/232669
PCT Pub. Date: Nov. 3, 2022

(65) Prior Publication Data
US 2024/0219889 A1 Jul. 4, 2024

Related U.S. Application Data
(60) Provisional application No. 63/182,029, filed on Apr. 30, 2021.

(51) Int. Cl.
*G05B 19/4099* (2006.01)
*G06K 19/067* (2006.01)
(Continued)

(52) U.S. Cl.
CPC ..... *G05B 19/4099* (2013.01); *G06K 19/0672* (2013.01); *G06K 19/0723* (2013.01);
(Continued)

(58) Field of Classification Search
CPC ...... G05B 19/4099; G05B 2219/49023; G06K 19/0672; G06K 19/0723; G06K 19/077; G06K 19/07722
See application file for complete search history.

(56) References Cited

U.S. PATENT DOCUMENTS 4,818,312 A 4/1989 Benge
6,922,146 B2 * 7/2005 Yogev ................ G08B 13/2414
340/568.2

(Continued)

FOREIGN PATENT DOCUMENTS

WO 2021242754 A1 12/2021
WO 2022232669 A1 11/2022

OTHER PUBLICATIONS

International Search Report and Written Opinion issued for Application PCT/US2022/027167 dated Jul. 19, 2022.

(Continued)

*Primary Examiner* — John A Tweel, Jr.

(57) ABSTRACT

Systems, apparatus, and methods for fabricating passive identification tags are provided. A method for fabricating a passive identification tag can include: determining a pattern for a resonant structure of a resonance layer of the passive identification tag, and/or determining a pattern for a dielectric structure of a characteristic layer to be disposed on the resonance layer. The method can further include: generating, based on the pattern for the resonant structure, the resonant structure on a substrate to form the resonance layer. The resonant structure generated by the method can respond to an incoming detection signal by transmitting or reflecting a tag response. The method can further include: generating, based on the pattern for the dielectric structure, the dielectric structure on the resonance layer to form the characteristic layer. The dielectric structure can modify the tag response, so that a modified tag response is transmitted or reflected to a receiver.

20 Claims, 7 Drawing Sheets

(51) Int. Cl.
*G06K 19/07* (2006.01)
*G06K 19/077* (2006.01)

(52) U.S. Cl.
CPC ..... *G06K 19/077* (2013.01); *G06K 19/07722* (2013.01); *G05B 2219/49023* (2013.01)

(56) References Cited

U.S. PATENT DOCUMENTS

| | | | | |
|---|---|---|---|---|
| 7,221,275 | B2 * | 5/2007 | Fletcher | G06K 19/0672 340/572.1 |
| 9,740,975 | B2 * | 8/2017 | Gibson | G06K 19/0672 |
| 11,966,800 | B2 * | 4/2024 | Gautier Le Boulch | G06K 19/0672 |
| 12,217,120 | B2 * | 2/2025 | Young | G06K 7/10148 |
| 2004/0134991 | A1 | 7/2004 | Fletcher et al. | |
| 2009/0219144 | A1 | 9/2009 | Pettus | |
| 2018/0012046 | A1 | 1/2018 | van der Weide et al. | |
| 2020/0234097 | A1 | 7/2020 | Nakano et al. | |
| 2023/0259732 | A1 * | 8/2023 | Young | H01Q 1/2225 340/10.1 |
| 2025/0111179 | A1 * | 4/2025 | Young | G01S 13/751 |

OTHER PUBLICATIONS

Notification Concerning Transmittal of International Preliminary Report on Patentability issued for PCT Application No. PCT/US2022/027167; 7 pages; dated Nov. 9, 2023.

* cited by examiner

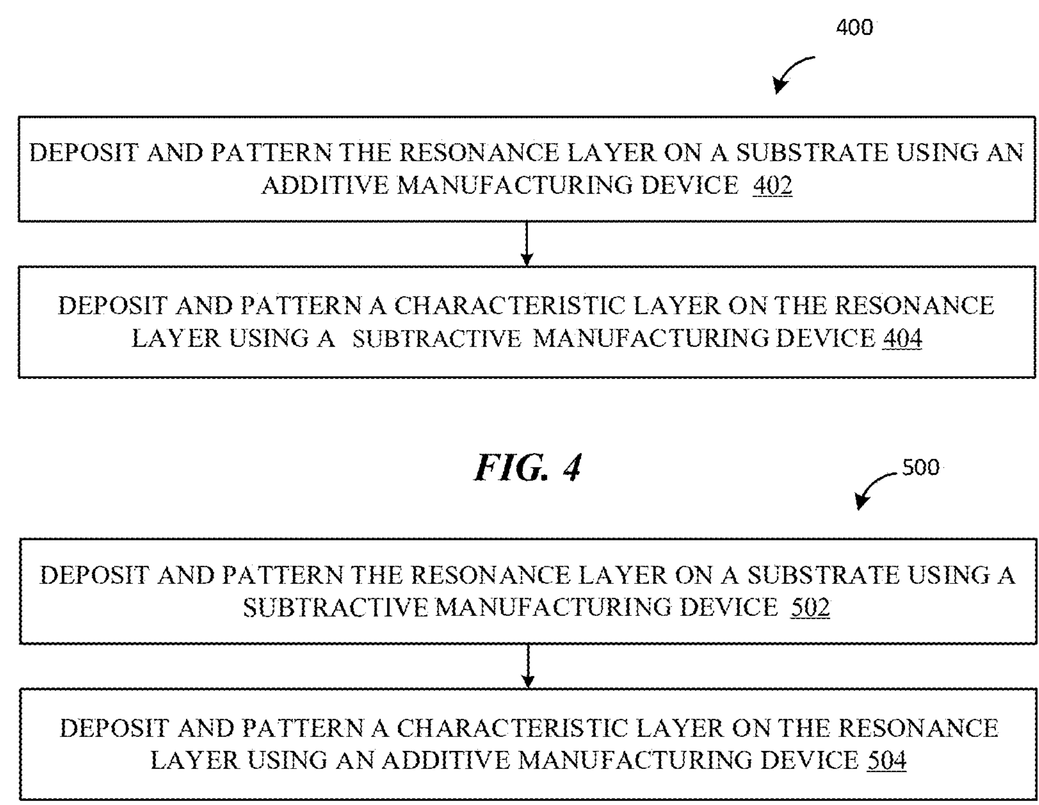
*FIG. 4*
*FIG. 5*
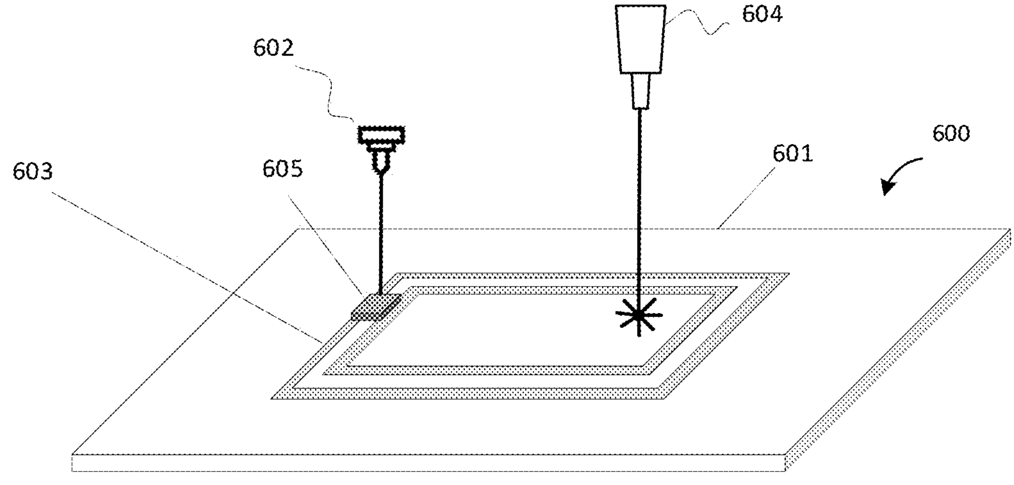
*FIG. 6*

(PRIOR ART)

PASSIVE IDENTIFICATION TAG FABRICATION METHODS

STATEMENT OF GOVERNMENT INTEREST

This invention was made with government support under Contract No. 1940248 awarded by the National Science Foundation. The government has certain rights in the invention.

TECHNICAL FIELD

The present disclosure relates generally to tags and, more particularly, relates to systems and methods for fabricating passive identification tags.

BACKGROUND

Tags are often used to identify and track objects or individuals. A tag can be an active identification tag or a passive identification tag, where the active identification tag often includes more electrical components (e.g., antenna, chip, sensors, and internal battery) than the passive identification tag to provide richer information and a longer read range. Due to its larger size and higher complexity to accommodate the various electrical components, the active identification tag is typically more expensive to fabricate. The higher expense and larger size can make the active identification tag less attractive for applications in inventory management and item tracking, when compared to the passive identification tag. However, a traditional passive identification tag often still accommodates an antenna and relies on a microchip (i.e., application-specific integrated circuit, ASIC) for generating responses to incoming detection signals ("interrogation signals"), where the microchip can be expensive and relatively difficult to manufacture. Chipless passive identification tags have been developed, but such tags often encode less amount of information than an active identification tag or a chip-based passive identification tag.

SUMMARY

Passive identification tags are widely used for applications in inventory and supply chain management, due to their low cost, durability, and ease of manufacturing. A passive identification tag can be chip-based or chipless. Unlike chip-based passive identification tag that typically includes an application-specific integrated circuit (ASIC, also referred to as chip or microchip) to encode information (e.g., ID, environmental data of the tag, etc.) and an antenna to supply power and transmit detection signals to the ASIC, a chipless passive identification tag further reduces the size, manufacturing complexity, and cost of tags by requiring no chip and/or no antenna.

Implementations disclosed herein relate to systems, apparatus, and methods for fabricating passive identification tags, where a passive identification tag can be chip-less and have a layered structure. The layered structure of the passive identification tag can include a substrate, and a resonance layer disposed on the substrate and having a resonant structure, where the resonant structure can include one or more resonant sub-structures ("resonators"). Alternatively, the layered structure of the passive identification tag can include a substrate, a resonance layer disposed on the substrate and having a resonant structure, and a characteristic layer disposed on the resonance layer and having a characteristic structure. The resonant structure can be made of a conductive material (e.g., metallic material). However, the present disclosure is not limited thereto, and in some implementations, the resonant structure can be made of a semiconductor material and/or a dielectric material. The characteristic structure can be a dielectric structure, a conductive structure, a semiconductor structure, or any combination thereof. The characteristic layer can be disposed on the substrate, and/or over the resonance layer.

The systems, apparatus, and methods disclosed herein can use, or otherwise include, one or more additive manufacturing devices (e.g., a piezoelectric inkjet printer, a thermal inkjet printer, and an aerosol jet printer), one or more subtractive manufacturing devices (e.g., a diamond cutting device, a laser cutting device, a water-jet cutting device, an electrical discharge machining ("EDM") device and a die cutting device), or any combination thereof, to fabricate such layered structure for the passive identification tags. Accordingly, the expenses of purchasing expensive chips as well as the process to perform interconnection between the chips and one or more corresponding antennas can be avoided, which reduces the fabrication cost of the passive identification tags. Because antennas typically have the largest volume in an identification tag, the size of the passive identification tags fabricated in accordance with one or more implementations disclosed herein can also be reduced by including no antenna.

In various implementations, a method for fabricating passive identification tags can include: determining a pattern (geometric dimensions, material, etc.) of a resonance layer of a passive identification tag. For example, the resonance layer may include a resonant structure, and in this case, the method can include: determining a pattern for the resonant structure of the resonance layer. The resonant structure of the resonance layer can be determined to include one or more resonant sub-structures ("resonators"). The one or more resonant sub-structures can include, for example, a square loop having a gap in one of the four sides. In this example, the square loop having the gap may form a single resonator. As another example, the one or more resonant sub-structures can include a square loop having a gap in each of the four (or two, three) sides of the square loop. In this example, the square loop having a gap in each of the four sides may provide four resonators. More generally, the one or more resonant sub-structures can include a first resonant sub-structure (i.e., a first resonator) and a second resonant sub-structure (i.e., a second resonator), where the first and second resonant sub-structures can each have the shape of square loop and together form two square loops disposed concentrically.

Optionally, the first and second resonant sub-structures can have different shapes and/or dimensions (e.g., thickness), can be discrete with each other, or can connect with each other. The resonance layer can include other components than the resonant structure, for example, the resonance layer can include a connection structure that connects the resonant structure to one or more external sensors. Optionally, the pattern for the resonant structure of the resonance layer of the passive identification tag can be stored in a tag design profile for the passive identification tag, where the tag design profile can be, for example, an AutoCAD profile showing a tag design of the passive identification tag, which is saved in a database or ledger for subsequent fabrication of the passive identification tag. Optionally, the tag design profile can include a pattern (e.g., geometric dimensions and material) for the connection structure relative to the pattern for the resonant structure, for subsequent fabrication of the resonance layer.

In some implementations, determining a pattern for the resonant structure of the resonance layer of the passive identification tag can include: selecting geometric dimensions (shape, location with respect to a substrate, thickness, and orientation) and material for the resonant structure (or for the one or more resonant sub-structures). Optionally or additionally, determining a pattern for the resonant structure of the resonance layer can further include: converting the resonant structure, based on the selected geometric dimensions and material of the resonant structure, into a simulated circuit (e.g., a LC circuit), where based on the simulated circuit, a simulated resonant frequency and/or a simulated tag response can be determined.

When the method is to fabricate a plurality of the passive identification tags to identify and track a corresponding number of items, determining the pattern for the resonant structure of the resonance layer can further include: validating the pattern for the resonant structure of the resonance layer by determining whether the simulated resonant frequency or the simulated tag response is unique to the passive identification tag. For example, when there are two items in an inventory system, two passive identification tags are needed to identify and track these two items (i.e., first tag to track the first item, and second tag to track the second item).

In this example, the method for fabricating passive identification tags can include determining a pattern for a resonant structure of the first tag, and determining a pattern for a resonant structure of the second tag. Here, determining the pattern for the resonant structure of the first and second tags can include: converting the resonant structure of the first tag into a first simulated circuit that has a first simulated resonance and that provides a first simulated tag response when receiving a predefined detection signal, and converting the resonant structure of the second tag into a second simulated circuit that has a second simulated resonance and that provides a second simulated tag response when receiving the predefined detection signal. Determining the pattern for the resonant structure of the first and second tags can further include: validating the pattern for the resonant structure of the first and second tags by determining whether the first simulated tag response is approximately the same as the second simulated tag response. If the first simulated tag response is approximately the same as the second simulated tag response, either the first or the second tag is invalidated, and the method for fabricating passive identification tags shall include determining and/or validating a pattern for a resonant structure of a third tag to fulfil the user's need for having two passive identification tags for respectively attaching to the first item and second item, to differentiate the first item from the second item (e.g., individually tracking the first item and the second item).

In various implementations, when the layered structure of the passive identification tag includes a characteristic layer disposed on the substrate and/or over the resonance layer, the method for fabricating passive identification tags can further include: determining a pattern of the characteristic layer with respect to the pattern of the resonance layer. The characteristic layer can, for example, include a dielectric structure, a conductive structure, a semiconductor structure, or any combination thereof. When the characteristic layer includes the dielectric structure, the method can include: determining a pattern for a dielectric structure of the characteristic layer with respect to the characteristic layer. When the characteristic layer includes the dielectric structure, the conductive structure, and/or the semiconductor structure, the method can include, determining a pattern for: the dielectric structure, the conductive structure, and/or the semiconductor structure, of the characteristic layer, with respect to the characteristic layer.

The dielectric structure of the characteristic layer can be determined to include one or more dielectric sub-structures, disposed on the substrate directly and/or over the resonance layer. For example, the one or more dielectric sub-structure can include a primary dielectric sub-structure disposed over the resonance layer, and/or a secondary dielectric sub-structure disposed on the substrate directly, in-between two or more resonators of the resonance layer. The words "primary" and "secondary" here, or the words "first" and "second" later, may be used for the mere purpose of differentiation. As another example, the one or more dielectric sub-structures can include a first dielectric sub-structure disposed on a top left corner of an outer square loop in the aforementioned resonant structure having two square loops that are disposed concentrically. Alternatively or additionally, the one or more dielectric sub-structures can include a second dielectric sub-structure disposed on a top right corner of an inner square loop in the aforementioned resonant structure having two square loops that are disposed concentrically. The first and second dielectric sub-structures can have different geometric dimensions (locations, shapes and/or thickness), can be discrete with each other, or can connect with each other. The present disclosure is not limited thereto.

Similar to the dielectric structure of the characteristic layer, the conductive structure of the characteristic layer can include one or more conductive sub-structures, that are disposed on the substrate and/or over the resonance layer. The semiconductor structure of the characteristic layer can include one or more semiconductor sub-structures, that are disposed on the substrate and/or over the resonance layer. Repeated descriptions are not provided herein. Optionally, the characteristic layer can include other components than the dielectric structure, the conductive structure, and the semiconductor structure. Optionally, the pattern for the resonant structure and the pattern for the dielectric structure to be disposed over, or in-between, the resonant structure can be stored in the tag design profile for the passive identification tag, for subsequent fabrication of the passive identification tag.

In some implementations, determining a pattern for the dielectric structure of the characteristic layer of the passive identification tag can include: selecting geometric dimensions (shape, location with respect to a substrate, thickness, and orientation) and material for the dielectric structure (or for the plurality of dielectric sub-structures). Optionally or additionally, determining the pattern for the dielectric structure of the characteristic layer can further include: converting the layered structure having the resonant structure and the dielectric structure into an additionally simulated circuit, where based on the additionally simulated circuit, an additionally simulated resonant frequency and/or an additionally simulated tag response are determined.

When the method is to fabricate a plurality of the passive identification tags to identify and track a corresponding number of items, determining the pattern for the dielectric structure of the characteristic layer can further include: validating the pattern for the dielectric structure of the characteristic layer by determining whether the additionally simulated resonant frequency or the additionally simulated tag response is unique to the passive identification tag. For example, when the first tag and the second tag are needed to respectively identify and track the first item and the second item, a pattern for the dielectric structure of the first tag is determined and converted into a first additionally simulated circuit, and a pattern for the dielectric structure of the second tag is determined and converted into a second additionally simulated circuit. Based on the first additionally simulated circuit and the second additionally simulated circuit, the pattern for the dielectric structure of the first (or the second) tag can be validated. For example, if the first additionally simulated circuit generates a different simulated tag response than the second additionally simulated circuit, both the patterns for the dielectric structure of the first and second tags are validated.

In various implementations, the method for fabricating passive identification tags can further include: generating, based on the pattern for the resonant structure, the resonant structure on a substrate to form the resonance layer, wherein the resonant structure generates a tag response in response to receiving an incoming detection signal. For example, the resonant structure can be formed by depositing a substantially planar layer of copper on the substrate, where the substantially planar layer of copper can be patterned (e.g., using a subtractive manufacturing device having a laser beam to cut or remove a portion of the substantially planar layer) to generate the resonant structure. When the passive identification tag having the generated resonant structure receives an incoming detection signal, the resonant structure generates a tag response, which can be received by a receiver and decomposed into a plurality of signal components to generate a tag ID for the passive identification tag. Optionally, depositing the substantially planar layer of copper (or other metallic material) can be implemented via a process of plating, sputtering, or metallic printing. Optionally, the subtractive manufacturing device can be a diamond tool, an abrasive laser, and a die cutting device, or other methods commonly used for removal of material from the substrate. Optionally, when the resonance layer is to include a connection structure that connects the resonant structure to one or more external sensors, the connection structure can be deposited on the substrate using an additive manufacturing device that precisely controls and deposits the pattern for the connection structure on the substrate.

Alternatively, the resonance layer can be formed on the substrate using an additive manufacturing process, where the additive manufacturing process can be a printing process. For example, metallic printing can be used to deposit, based on the pattern for the resonant structure, a plurality of resonant sub-structures onto the substrate to form the resonant structure. The plurality of resonant sub-structures can be different from each other, and provide a high level of design complexity and flexibility that is often too expensive to create using a non-additive manufacturing process.

In various implementations, the method for fabricating passive identification tags can further include: generating, based on the pattern for the dielectric structure and using a dielectric material, the dielectric structure on the substrate and/or over the resonance layer to form the characteristic layer, wherein the generation of the dielectric structure modifies the tag response to transmit and/or reflect the modified tag response. The dielectric structure can be formed on the substrate and/or over the resonance layer via an additive manufacturing process, using for example a piezoelectric inkjet printer, a thermal inkjet printer, an aerosol jet printer, or any other suitable device. The dielectric structure can also be formed using other methods, such as a combination of depositing and subtractive manufacturing.

In some implementations, the method described above may be embodied in, and automated by, code modules executable by one or more computers or processors. The code modules may be stored on any type of computer-readable medium or computer storage device, such as hard drives, solid state memory, optical disc, and the like. The systems or apparatus for fabricating passive identification tags may include the one or more computers or processors, and/or the computer-readable medium or computer storage device that stores the code modules. Optionally, the systems or apparatus for fabricating passive identification tags may include one or more input devices (e.g., keyboard, microphone, touchpad, camera, scanner), and one or more output devices (e.g., speaker, display). The various features and processes described above may be used independently of one another, or may be combined in various ways.

At least one aspect of the disclosure is directed to a method of fabricating a passive identification tag. The method includes: determining a pattern for a resonant structure of a resonance layer of the passive identification tag, and determining a pattern for a dielectric structure of a characteristic layer to be disposed on the resonance layer. The method can further include: generating, based on the pattern for the resonant structure and using a conductive material, the resonant structure on a substrate to form the resonance layer, where the resonant structure can generate a tag response in response to receiving an incoming detection signal. The method can further include: generating, based on the pattern for the dielectric structure and using a dielectric material, the dielectric structure on the resonance layer to form the characteristic layer, where the dielectric structure is configured to modify the tag response to transmit and/or reflect the modified tag response.

Exemplary optional features of the system may be as follows. Optionally, determining the pattern for the resonant structure can include: validating the pattern for the resonant structure. Optionally, validating the pattern for the resonant structure can include: determining a first set of equations that equate the resonant structure to a first circuit, and retrieving the first set of equations to determine, based on the first circuit, an original tag response of the resonant structure responsive to the incoming detection signal. Optionally, determining the pattern for the dielectric structure can include: validating the pattern for the dielectric structure, where validating the pattern for the dielectric structure can include: determining a second set of equations that equate the resonant structure and the dielectric structure to a second circuit; retrieving the second set of equations to modify, based on the second circuit, the original tag response of the resonant structure and the dielectric structure, to generate a modified tag response for the passive identification tag in response to the incoming detection signal; determining a tag identification (ID) based on the modified tag response responsive to the incoming detection signal; and validating, based on the tag ID, the pattern for the dielectric structure.

Optionally, generating the resonant structure on the substrate comprises: forming a layer of the conductive material on the substrate, and patterning the layer of the conductive material to form the resonant structure using a subtractive manufacturing device. Optionally, the subtractive manufacturing device includes one or more of: a diamond tool, an abrasive laser, and a die cutting apparatus.

Optionally, generating the dielectric structure on the resonance layer includes: selectively depositing the dielectric material on the resonance layer in the determined pattern for the dielectric structure using an additive manufacturing device. Optionally, the additive manufacturing device includes one or more of: a piezoelectric inkjet printer, a thermal inkjet printer, and an aerosol jet printer or other method of selectively depositing a material on a substrate.

Optionally, the resonance layer and/or the characteristic layer are formed using a combination of an additive manufacturing device and a subtractive manufacturing device. Optionally, the resonance layer can include a connection structure that connects the resonance layer to one or more external sensors for sensing at least one environmental parameter of an environment to which the passive identification tag is exposed.

Optionally, the resonance layer is made of one or more of copper, Graphene, silver, carbon black, graphite, aluminium or other conductive material. Optionally, the characteristic layer is made of one or more of PET, PU, HDPE, carbon black, Barium Titanate, TiO2, ZrO2, HfO2, PZT, PbO, PMMA, polymers, SiO2, ZnO, ITO, IGZO, or other conductive, semiconducting, or dielectric material.

Optionally, the method further includes: forming a protection layer on the characteristic layer. The protection layer can encapsulate the resonant and characteristic layers of the passive identification tag, to minimize the influence of different environmental factors (e.g., chemical or mechanical) on the passive identification tag.

At least one aspect of the disclosure is directed to a system that includes a computing device having one or more processors and a memory, a printing device. The one or more processors determine a pattern for a resonant structure of a resonance layer of a passive identification tag and a pattern for a dielectric structure of a characteristic layer to be disposed on the resonance layer. The printing device can include an additive manufacturing device and/or a subtractive manufacturing device. The printing device can generate, based on the pattern for the resonant structure and using a conductive material, the resonant structure on a substrate to form the resonance layer. The printing device can generate, based on the pattern for the dielectric structure and using a dielectric material, the dielectric structure on the resonance layer to form the characteristic layer.

Exemplary optional features of the system may be as follows. Optionally, prior to generating the resonant structure and the dielectric structure, the one or more processors may determine a first set of equations that equate the resonant structure to a first circuit, and determine, based on the first circuit, an original tag response of the resonant structure responsive to an incoming detection signal.

Optionally, the one or more processors may further determine a second set of equations that equate the resonant structure and the dielectric structure to a second circuit; modify, based on the second circuit, the original tag response of the resonant structure and the dielectric structure, to generate a modified tag response for the passive identification tag in response to the incoming detection signal; determine a tag identification (ID) based on the modified tag response responsive to the incoming detection signal; and validating, based on the tag identification, the resonant structure and the dielectric structure.

Optionally, the printing device may further generate a protection layer that encapsulates the passive identification tag, in particular the resonance and characteristic layers, to prevent influence on the passive identification tag from external environment conditions of, but not limited to: chemical or mechanical. For example, the printing device can generate a protection layer on the characteristic layer, where the protection layer extends over side walls of the characteristic layer and side walls of the resonance layer to seal the passive identification tag. Optionally, the resonance layer is made of one or more of copper, Graphene, silver, carbon black, graphite, carbon nanotube, a metallic alloy, Nickel, Au, Pd, Pt, aluminium, other conductive material, or any combination thereof. Optionally, the characteristic layer is made of one or more of PET, PU, HDPE, carbon black, TiO2, or other conductive, semiconducting, or dielectric material.

Optionally, the subtractive manufacturing device includes one or more of: a diamond tool, an abrasive laser, and a die cutting apparatus; and the additive manufacturing device includes one or more of: a piezoelectric inkjet printer, a thermal inkjet printer, and an aerosol jet printer.

At least one aspect of the disclosure is directed to a method of fabricating a tag. The method includes: determining a pattern for a resonant structure of a resonance layer of the tag; determining a pattern for a characteristic layer with respect to the resonance layer; generating, based on the pattern for the resonant structure and using a conductive material, the resonant structure on a substrate to form the resonance layer, wherein the resonant structure generates a tag response in response to receiving an incoming detection signal; and generating, based on the pattern for the characteristic layer, the characteristic layer on the substrate and/or over the resonance layer to form the characteristic layer, wherein the characteristic layer modifies the tag response to generate a modified tag response.

The individual features and/or combinations of features defined above in accordance with any aspect of the present invention or below in relation to any specific embodiment of the invention may be utilized, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 illustrates an example method of fabricating resonance and characteristic layers for a passive identification tag, according to one or more embodiments described herein;

FIG. 5 illustrates another example method of fabricating resonance and characteristic layers for a passive identification tag, according to one or more embodiments described herein;

FIG. 6 illustrates an example system of fabricating a passive identification tag, according to one or more embodiments described herein;

DETAILED DESCRIPTION

Figure 7:
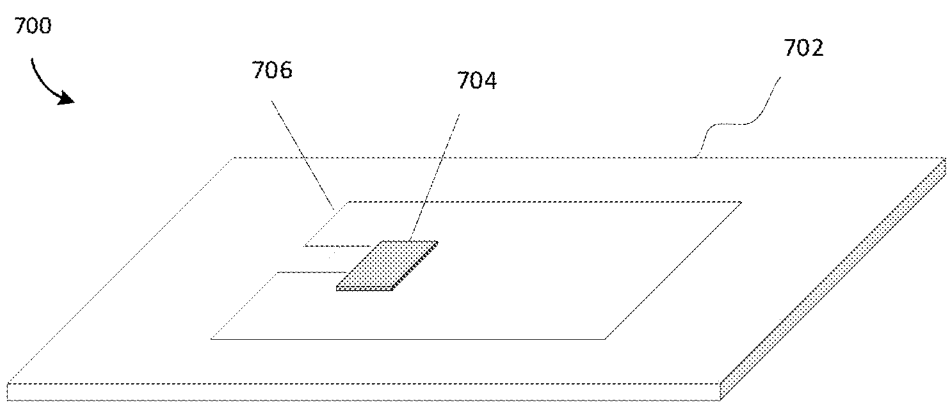
FIG. 7 illustrates an existing passive identification tag.

Different from active identification tags, passive identification tags often do not include an internal power source such as a battery. Without an internal power source, a passive identification tag can be designed to have a relatively small volume and be manufactured at a relatively low cost, making it suitable for attachment to products such as boxes, paper, and clothing, for applications in inventory management, item tracking, etc. The common structure of a passive identification tag is illustrated in FIG. 7, where the passive identification tag 700 can include a substrate 702, a chip 704 (e.g., an application-specific integrated circuit, "ASIC") disposed on the substrate 702, and an antenna 706 that is disposed on the substrate 702 and coupled to the chip 704 to receive detection signals from a transmitter (which can be an "interrogator" or a part thereof) and to transmit or reflect a spectral signature ("tag response") of the tag 700 towards a receiver (which can be the "interrogator" or a part thereof). The substrate 702 can be flexible (e.g., made of thin plastic material) or rigid. The antenna 706 can have a customised shape designed for a specific frequency of operation. The chip 704 may include a memory (e.g., electrically erasable, programmable, read-only memory, "EEPROM") that stores data or information, such as tag ID, password, and error detection code. The chip 704 may need power to operate, and such power can be supplied by the antenna 706 upon receiving radio waves from the transmitter (or the interrogator).

However, the chip 704 is still known to have relatively short durability, and is relatively expensive, due to its complicated manufacturing and assembling processes (which often requires clean room facilities, individual testing to ensure reliable functionality, and precise connection to the antenna 706), as well as the relatively high cost of the semiconductor material (e.g., silicon) that makes the chip 704. To further lower the production cost of a passive identification tag (e.g., tag 700 in FIG. 7), a system and method of designing a chipless passive identification tag and a fabrication method thereof are described, which aim at removing the chip 704 (often the most expensive tag component) as well as the antenna 706 (often the largest tag component) while maintaining a relatively high data storage capacity.

Implementations disclosed herein relate to systems, devices and methods for designing and fabricating such passive identification tags, and other applicable tags as well. In some implementations, a tag (e.g., passive identification tag) can be designed to have a layered structure, where the layered structure can include a substrate, a resonance layer disposed over the substrate, and a characteristic layer disposed over the resonance layer, and/or one or more other layers disposed over the characteristic layer. To fabricate such tag, an additive manufacturing device and/or a subtractive manufacturing device may be selected based on the pattern of the resonant structure as well as the pattern of the characteristic layer designed for the tag, customised to satisfy the user's need (e.g., the total number and overall cost of the tags required for a batch of goods stored in a warehouse).

In some implementations, the resonance layer includes a resonant structure that responds to an interrogation signal ("detection signal"), and/or a connection structure that connects the resonant structure to one or more external sensors. In this situation, determining (or designing) a pattern of the resonance layer include determining a pattern (material, geometric dimensions, etc.,) for a resonant structure of the resonance layer, where the resonant structure of the resonance layer can include a plurality of resonant sub-structures. For example, the plurality of resonant sub-structures can include a first resonant sub-structure and a second resonant sub-structure, where the first and second resonant sub-structures can each have the shape of square loop and together form two square loops disposed concentrically. In other examples, the first and second resonant sub-structures can have different shapes and/or thickness, can be discrete with each other, or can connect with each other. In some implementations, the pattern for the resonant structure of the resonance layer of the passive identification tag can be stored in a tag design profile, accessible by the additive manufacturing device (or the subtractive manufacturing device) for subsequent fabrication of the tag.

In some implementations, when the layered structure includes the characteristic layer having a dielectric structure, determining a pattern of the characteristic layer can include determining a pattern for the dielectric structure of the characteristic layer. The dielectric structure of the characteristic layer can be customised or designed to include one or more dielectric sub-structures. As a non-limiting example, the one or more dielectric sub-structures can include a first dielectric sub-structure disposed on a top left corner of an outer square loop in the aforementioned resonant structure having two square loops that are disposed concentrically. In other examples, the first and second dielectric sub-structures can have different shapes and/or thickness, can be discrete with each other, or can connect with each other. In some implementations, the characteristic layer can include other components than the dielectric structure. In some implementations, the pattern for the dielectric structure can be stored in the tag design profile that stores the pattern for the resonant structure, or can be stored in a separate tag design profile, to be accessed by the additive manufacturing device and/or the subtractive manufacturing device to subsequently fabricate the tag.

In some implementations, before fabricating the tag based on the pattern for the resonant structure and the pattern for the dielectric structure using the additive manufacturing device and/or the subtractive manufacturing device, the pattern for the resonant structure and the pattern for the dielectric structure needs to be validated, to ensure that the tag generates a tag response that differentiates itself from other tags when the tag and the other tags receive the same incoming detection signal. In some implementations, the tag response generated by the tag may be analysed to generate or retrieve a tag identification ("tag ID") to identify or track a product to which the tag ID is attached or adhered. These implementations, however, are not intended to be limiting, and detailed descriptions of these and additional implementations are provided hereinafter.

Figure 1:
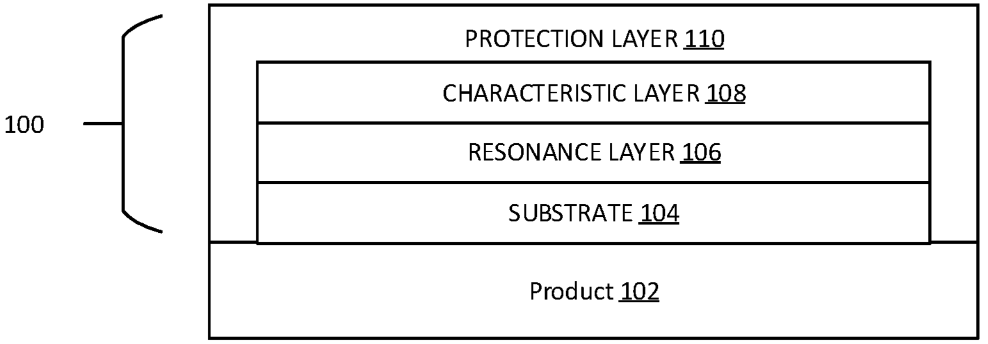
FIG. 1 illustrates an example structure of a passive identification tag, according to one or more embodiments described herein.

FIG. 1 illustrates an example structure of a passive identification tag 100 that encodes tag identification data (e.g., tag ID) for identifying or tracking a product 102 to which the passive identification tag 100 is attached. As shown in FIG. 1, the passive identification tag 100 can be disposed on an upper surface of a product 102. For example, a bottom surface of the passive identification tag 100 can be coated with an adhesive layer (not shown) for adhesion to the product 102. Alternatively, the passive identification tag 100 can be imbedded into the product 102, for example, the passive identification tag 100 can be placed in a slot of the product 102. Alternatively, the passive identification tag 100 can be made into the product 102, for example, by utilizing a moulding machine to inject the passive identification tag 100 onto the product 102. The passive identification tag 100 can include a substrate 104, and a resonance layer 106 disposed on the substrate 104. In some implementations, the passive identification tag 100 can further include a characteristic layer 108 disposed on the resonance layer 106. In some implementations, the passive identification tag 100 can further include a protection layer 110 disposed on the characteristic layer 108.

The substrate 104 can be a portion of the product 102 (or the substrate 104 is the product 102), so that the resonance layer 106 is disposed directly on or into the product 102. The upper surface of the product 102 can be, for example, made of paper, wood, clothing, etc., and the product 102 can be, for example, a paper, a card, a box, or a pant, etc. The substrate 104 can be made of one or more materials including: high-density polyethylene (HDPE), carbon black, $TiO_2$ (Titanium Dioxide), polymer, polyvinyl chloride (PVC), polythylenethere phthalate (PET), phenolics, polyesters, styrene, and even paper, which are limited thereto. The resonance layer 106 can be a patterned layer, and can be made of a metallic or otherwise conductive material, such as copper, silver, graphene, aluminium, or any combination thereof.

In some implementations, as discussed above, the passive identification tag 100 can include a substrate 104, and a resonance layer 106 disposed on the substrate 104. In this case, the resonance layer 106 can have a metallic structure that generates a tag response upon receiving an incoming detection signal (also called as "interrogation signal"), where the tag response can be detected by a reader (or "receiver", "transceiver", "interrogator", etc.) and utilized to generate a tag ID that identifies the passive identification tag 100. In some other implementations, as discussed above, the passive identification tag 100 can include the characteristic layer 108 disposed on the resonance layer 106, in addition to the resonance layer 106 being disposed on the substrate 104. In this case, the characteristic layer 108 can include a characteristic structure that is configured to modify the tag response generated by the passive identification tag 100 (or the resonance layer 106) to generate a modified tag response. The modified tag response can be received by the reader (or "receiver", "transceiver", "interrogator", etc.) and be utilized to generate the tag ID. The characteristic structure can be a dielectric structure, a conductive structure, a semiconductor structure, or any combination thereof, and the present disclosure is not limited thereto.

Optionally, the protection layer 110 can be disposed on the characteristic layer 108 and extend to cover side walls of the characteristic layer 108, side walls of the resonance layer 106, and side walls of the substrate 104, to reach the upper surface of the product 102 (for example, covering a portion of the upper surface of the product 102), to prevent the passive identification tag 100 from being exposed to an environment (e.g., moisture) that causes or accelerates the degradation of the passive identification tag 100. Optionally, in situations where the substrate 104 is the product 102 (namely, the passive identification tag 100 is to be disposed on the product 102 directly), the protection layer 110 can be disposed on the characteristic layer 108 and extend to cover side walls of the characteristic layer 108 and side walls of the resonance layer 106, to reach an upper surface of the substrate 104, to prevent the passive identification tag 100 from being exposed to an environment (e.g., moisture) that causes or accelerates the degradation of the passive identification tag 100. When the passive identification tag 100 includes the resonance layer 106 but no characteristic layer 108, the protection layer 110 can be disposed on the resonance layer 106 and cover the side walls of the resonance layer 106 to reach the upper surface of the substrate 104 (or the upper surface of the product 102). Repeated descriptions are omitted herein.

The resonance layer 106 can include a resonant structure having a predetermined pattern (e.g., made of copper). In some implementations, the resonant structure having the predetermined pattern can have a first thickness (uniform or varied). In some implementations, the resonant structure having the predetermined pattern can include a plurality of resonant sub-structures (not shown in FIG. 1) having the same (or different) geometric shape and dimensions, where the plurality of resonant sub-structures can respond to an incoming detection (e.g., RF) signal by providing a tag response that encodes identification data of the passive identification tag 100. The identification data encoded in the tag response may be utilized to form or retrieve a tag ID for the product 102 to which the passive identification tag 100 is attached. The plurality of resonant sub-structures can be converted into a circuit, e.g., an inductor-capacitor (LC) circuit. The plurality of resonant sub-structures may be made of one or more metallic materials (or otherwise conductive materials), such as copper, silver, graphene, aluminium, or a combination thereof.

As a non-limiting example, the plurality of resonant sub-structures of the resonant structure of the resonance layer 106 can include four square slots made of silver, where the four square-slots respond to an incoming detection signal by generating a first tag response. The first tag response can be a first signal having a first real portion and a first imaginary portion. Optionally, the first real portion of the first tag response can be a function of frequency and/or time and the first imaginary portion of the first tag response can be a function of frequency and/or time. Such first real portion and first imaginary portion can be applied to determine one or more of: a first amplitude of the first tag response as a function of frequency, a first phase of the first tag response as a function of frequency, a first group-delay of the first tag response as a function of frequency, and a first phase-delay of the first tag response as a function of frequency. Additionally, the first amplitude of the first tag response can further include a first real amplitude of the first tag response as a function of frequency, and a first imaginary amplitude of the first tag response as a function of frequency. For each of the first amplitude (or first real amplitude or first imaginary amplitude) as a function of frequency, first phase as a function of frequency, first group-delay as a function of frequency, and first phase-delay as a function of frequency, a characteristic value can be determined, and one or more (e.g., three or four) of the characteristic values can be utilized to compute an unmodified tag ID using one or more computing algorithms.

In some implementations, one or more parameters of the resonant structure (e.g., the plurality of resonant sub-structures) in the resonance layer 106 can be modified to generate a second tag response that is different from the first tag response, where the one or more parameters of the resonant sub-structures include: the total number, shapes, materials, polarization, and geometric dimensions (thickness, length, positions, etc.) of the resonant sub-structures. For example, when the aforementioned four square slots are made of copper instead of silver with other parameters remaining the same, the resonant sub-structures in the resonance layer 106 can generate a second tag response that is different from the first tag response. The second tag response can include a second real portion of the second tag response (different from the first real portion of the first tag response) as a function of frequency, and a second imaginary portion of the second tag response (different from the first imaginary portion of the first tag response) as a function of frequency, where the second real portion and the second imaginary portion can be utilized to determine a second amplitude as a function of frequency, a second phase as a function of frequency, a second group-delay as a function of frequency, and a second phase-delay as a function of frequency. The second amplitude of the second tag response as a function of frequency is different from the first amplitude of the first tag response as a function of frequency. The second phase of the second tag response as a function of frequency is different from the first phase of the first tag response as a function of frequency. The second group-delay of the second tag response as a function of frequency is different from the first group-delay of the first tag response as a function of frequency. The second phase-delay of the second tag response as a function of frequency is different from the first phase-delay of the first tag response as a function of frequency.

Optionally, to monitor environmental conditions (e.g., heat, moisture, vibration, sunlight, corrosion, chemicals, abrasion) that affect the substrate 104 and other components of the passive identification tag 100 (e.g., the resonant structure and the dielectric structure), the resonance layer 106 may further include a connection structure (not shown in FIG. 1) in addition to the resonant structure. The connection structure can connect the resonance layer 106 to one or more external sensors. The one or more external sensors can sense at least one environmental parameter (e.g., temperature, pressure, and humidity) of the passive identification tag 100. The at least one environmental parameter may be stored in association with the time and condition of the passive identification tag 100 in a database or ledger.

In some implementations, the resonance layer 106 can be formed on the substrate 104 by depositing a uniform (e.g., substantially planar) layer of conductive material on the substrate 104, and by further patterning the deposited uniform layer to generate the aforementioned resonant structure. The uniform layer of conductive material may be deposited using a suitable deposition process such as plating, sputtering, or metallic printing. The resonant structure may be generated using a subtractive manufacturing process, such as laser abrasion, garnet abrasion, or die cutting, to process the uniform layer. The apparatus for performing the subtractive manufacturing process can include, for example, a diamond tool, an abrasive laser, and a die cutting device.

Figure 9A:
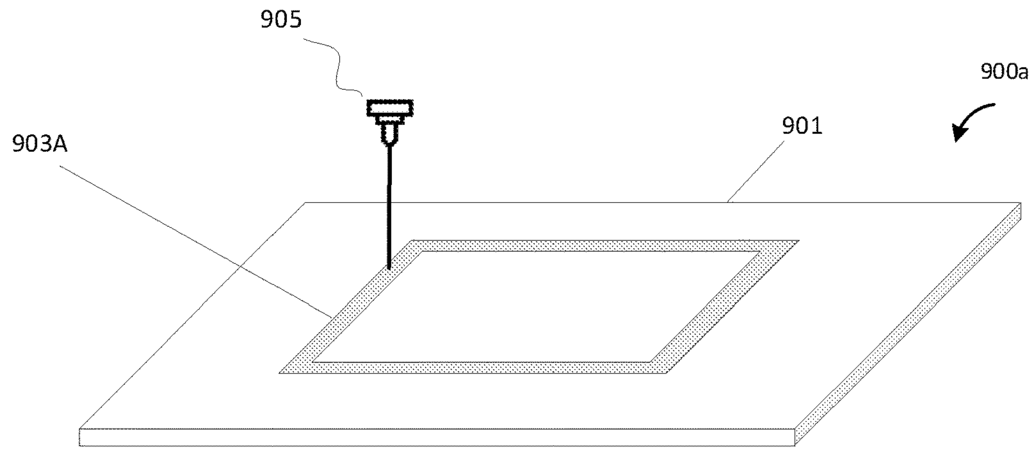
FIG. 9A illustrates a first intermediate manufacturing process that disposes a first resonant sub-structure on a substrate, according to one or more embodiments described herein.
Figure 9B:
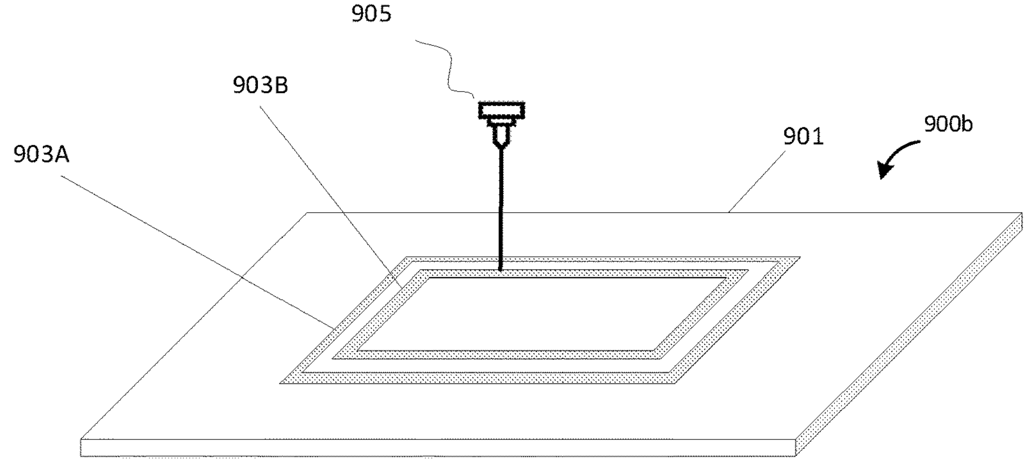
FIG. 9B illustrates a second intermediate manufacturing process that disposes a second resonant sub-structure on the substrate having the first resonant sub-structure (FIG. 9A), according to one or more embodiments described herein.

In some other implementations, the resonance layer 106 can be formed on the substrate 104 by disposing a predetermined pattern of conductive material on the substrate 104 via an additive manufacturing process, where the additive manufacturing process can be a metallic printing process. For example, the metallic printing process may be applied to form a plurality of resonant sub-structures, made of a conductive material and independent of each other (or coupled to each other), on the substrate 104. FIGS. 9A and 9B provide two intermediate states **900*a* and 900*b*** for manufacturing a passive identification tag, in accordance with various implementations herein.

As shown in FIG. 9A, in the first intermediate state **900*a*, a first resonant sub-structure 903A is disposed on a substrate 901, where a printing head 905 (e.g., a laser head) of a printing device (e.g., additive manufacturing device) can dispose a first metallic material onto the substrate 901 to form the first resonant sub-structure 903A. As shown in FIG. 9B, in the second intermediate state 900*b*, a second resonant sub-structure 903B is disposed on the substrate 901, where the printing head 905 of the printing device can dispose a second metallic material onto the substrate 901 to form the second resonant sub-structure 903B. The first metallic material can be the same as or different from the second metallic material. In some implementations, as shown in FIG. 9B, the first resonant sub-structure 903A and the second resonant sub-structure 903B can be disposed concentrically and have a similar shape (but different geometric dimensions). In some other implementations, the first resonant sub-structure 903A can be connected to the second resonant sub-structure 903**B and have the same (or different) shape.

Figure 9C:
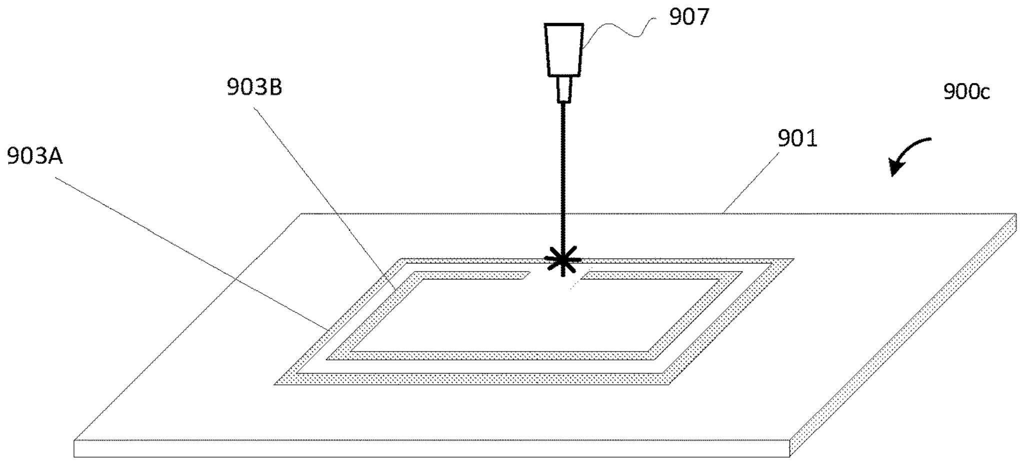
FIG. 9C illustrates a third intermediate manufacturing process that removes a portion of the second resonant sub-structure that is disposed on the substrate (see FIG. 9B), according to one or more embodiments described herein.

In some other implementations, the resonance layer 106 can be formed via a combination of a subtractive manufacturing process and an additive manufacturing process. For example, the resonance layer 106 can be formed using a subtractive manufacturing process, followed by an additive manufacturing process. As another example, the resonance layer 106 can be formed using an additive manufacturing process, followed by a subtractive manufacturing process. FIG. 9C illustrates a third intermediate state **900*c* in which a portion of the second resonant sub-structure 903B in FIG. 9B is removed. As shown in FIG. 9B, the portion of the second resonant sub-structure 903B can be precisely removed using a beam emitted by a laser head 907**.

The characteristic layer 108 can include a dielectric (i.e., non-conductive) structure having a second thickness, where the dielectric structure is disposed on the resonance layer 106 to modify the tag response generated by the resonant structure of the resonance layer 106. One or more parameters of the dielectric structure can be relied on to modify the tag response of the resonance layer 106 via absorption, reflection, and/or transmission of the incoming detection signal. The one or more parameters of the dielectric structure can include a material of the dielectric structure, and geometric dimensions (shape, position, orientation, thickness, etc.) of the dielectric structure. Optionally, the dielectric structure can include a plurality of dielectric sub-structures. For example, the plurality of dielectric sub-structures can include a first dielectric sub-structure disposed on the resonance layer 106 to cover a top surface of a portion of the resonant structure, leaving the remaining portion of the resonant structure uncovered.

As another example, when the resonant structure of the resonance layer 106 includes a plurality of resonant sub-structures having a first resonant sub-structure and a second resonant sub-structure, the plurality of dielectric sub-structures can include a first dielectric sub-structure disposed on the resonance layer 106 to cover a portion of the first resonant sub-structure and a portion of the second resonant sub-structure, leaving the rest remaining portion of the resonant structure uncovered. In a third example, the plurality of dielectric sub-structures can include a first dielectric sub-structure disposed on the resonance layer 106 to cover a portion of the first resonant sub-structure, and a second dielectric sub-structure disposed on the resonance layer 106 to cover a portion of the second resonant sub-structure, leaving the rest remaining portion of the resonant structure uncovered. In this example, the first and second dielectric sub-structures may have substantially the same (or different) shape and geometric dimensions (e.g., thickness), but may not be in touch with each other.

In one implementation, a dielectric structure can be disposed on the aforementioned resonance layer having four square slots (made of silver) that respond to an incoming detection signal by generating the first tag response, where the incoming detection signal has a first frequency range. In this implementation, due to the addition of the dielectric layer, instead of the first tag response, the passive identification tag may respond to the same incoming detection signal (e.g., having the first frequency range) by generating a third tag response. The third tag response is different from the first and second tag responses discussed above. The third tag response can be a RF signal having a third real portion and a third imaginary portion. The third real portion of the third tag response can be a function of frequency and the third imaginary portion of the third tag response can also be a function of frequency. The third real portion and third imaginary portion can be applied to determine a third amplitude of the third tag response as a function of frequency, a third phase of the third tag response as a function of frequency, a third group-delay of the third tag response as a function of frequency, and a third phase-delay of the third tag response as a function of frequency.

For each of the third amplitude of the third tag response as a function of frequency, third phase of the third tag response as a function of frequency, third group-delay of the third tag response as a function of frequency, and third phase-delay of the third tag response as a function of frequency, a characteristic value may be determined. Two or more of these characteristic values can be utilized to compute a tag ID using one or more computing algorithms. Accordingly, by disposing a dielectric structure on top of a resonance layer for a passive identification tag, the tag response of the passive identification tag is modified and a corresponding tag ID is computed to differentiate the passive identification tag having no dielectric structure from the passive identification tag having the dielectric layer.

The characteristic layer 108 can be formed on the resonance layer 106 via an additive manufacturing process, using for example a piezoelectric inkjet printer, a thermal inkjet printer, and/or an aerosol jet printer. The characteristic layer 108 can be formed to selectively cover portions of the resonance layer 106 with a uniform or varied thickness to modify the tag response generated by the resonant structure of the resonance layer 106. In some implementations, the characteristic layer 108 can be formed by forming a substantially planar layer of dielectric (or non-conductive) material on the resonance layer 106, and by further patterning the substantially planar layer of dielectric material to generate the dielectric structure. The forming of the substantially planar layer of dielectric layer may be implemented via plating, sputtering, or printing. The patterning may include a selective removing process where one or more portions of the substantially planar layer of dielectric material are removed via a subtractive manufacturing process, such as laser abrasion, garnet abrasion, or die cutting. Optionally, the characteristic layer 108 can include a sensing structure for connection to one or more external sensors. The sensing structure in the characteristic layer 108 can be the same or different from the connection structure in the resonance layer 106.

The protection layer 110 can be made of a polymeric material, such as high-density polyethylene (HDPE), to protect the passive identification tag 100 from being exposed to an undesired environment (e.g., moisture, heavily stacked, etc.). However, the protection layer 110 can be optional.

Optionally, the passive identification tag 100 may further include a sensor layer to connect the passive identification tag 100 with external sensors, e.g., via resonance or other conductive structures. The sensor layer can include one or more conductive structures, and have a varied resistance or conductivity. The sensor layer can be, for example, formed on the characteristic layer 108, or sandwiched between the characteristic layer 108 and the protection layer 110.

Optionally, the passive identification tag 100 may further include a reference layer that includes a reference structure (e.g., a reference conductive structure made of a conductive material) configured to generate a reference response, where the reference response can be configured to inform the receiver or transceiver that the passive identification tag 100 is being read, which facilitates the subsequent processing of the tag response. In some implementations, for passive identification tags having different resonance layers and/or different characteristic layers, the same reference layer (or the same reference conductive structure) can be included in each of the passive identification tags, where such reference layer generates the same reference signal (because the reference conductive structure does not change across the passive identification tags) when each of the passive identification tags receives the same detection signal, thereby normalizing the passive identification tags, for quicker tag detection and analysis. The reference layer can be, for example, disposed on the substrate, and be included in the resonance layer 106.

Optionally but not necessarily, the passive identification tag 100 may further a tuning layer. The tuning layer can include conductive structures configured to tune the detection signal received by the passive identification tag 100 from the transmitter or transceiver. For example, the tuning layer may tune the detection signal received from the transmitter by allowing a particular type (e.g., in terms of power, incident angle, polarization, frequency) of signal wave of the detection signal to induce a corresponding tag response from the passive identification tag 100.

Optionally but not necessarily, the passive identification tag 100 may further a polarizing layer, where the polarizing layer can be non-conductive and can include a charged boundary to allow certain detection signals (e.g., in terms of incident angle, polarization, frequency, power, and/or phase) to pass therethrough.

Figure 2:
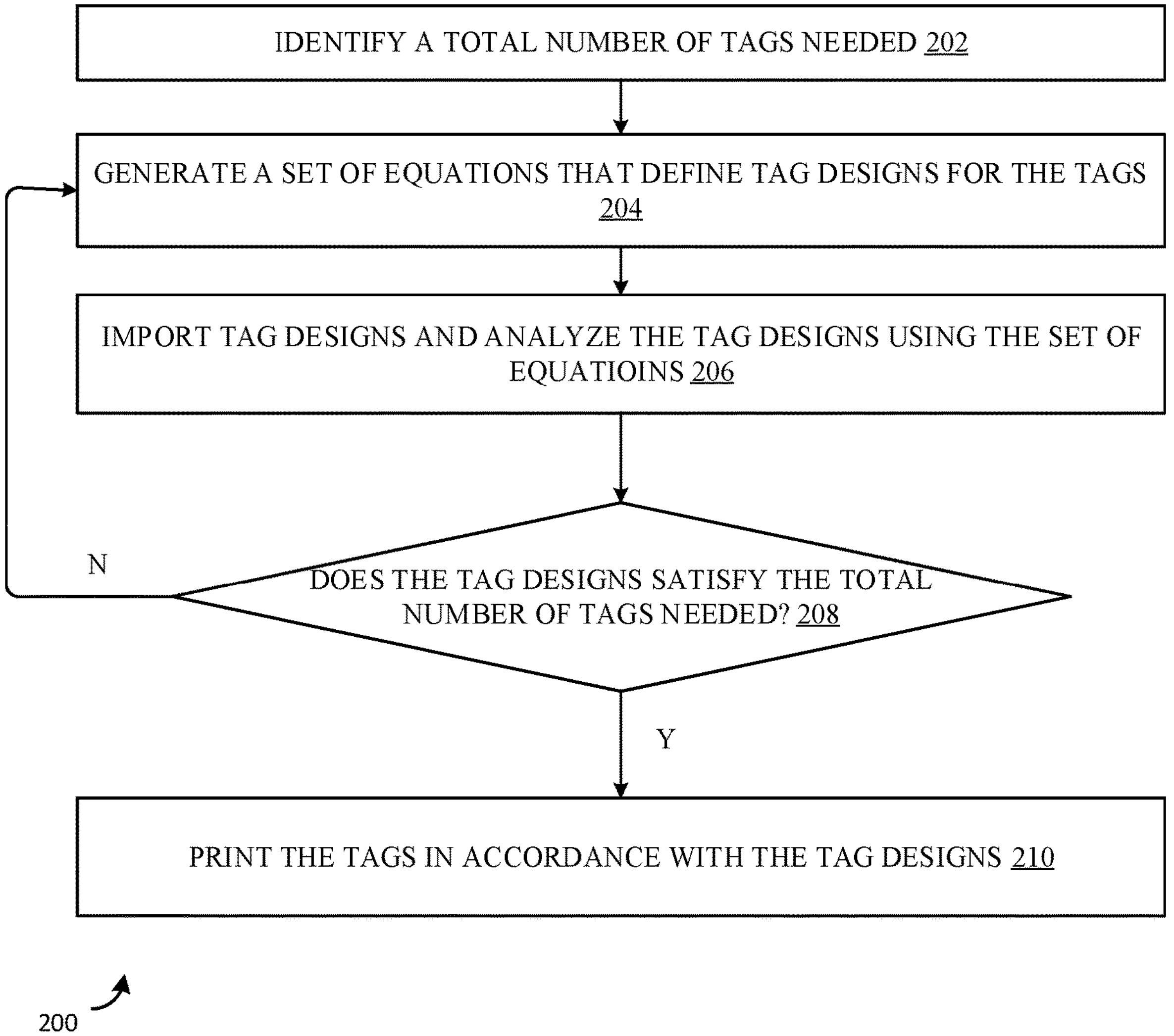
FIG. 2 illustrates an example method of designing a passive identification tag, according to one or more embodiments described herein.

FIG. 2 illustrates an example method 200 of designing a passive identification tag, according to one or more embodiments described herein. As shown in FIG. 2, the method 200 can include: at block 202, identifying a total number of tags required based on a total number of items to be tracked in an inventory system. For example, when an inventory system needs to track a total number of N different products, it can be determined that a total number of N tags need to be designed.

The method 200 can further include: at block 204, generating, based on the identified total number of tags, a set of equations for tag designs of the tags. For a total number of N different products, a total number of N tags are needed, and correspondingly, at least N tag designs (e.g., M tag designs, where M is a positive integer greater than or equal to N) are needed, where for each tag design, one or more equations are generated and stored in a tag design file for a corresponding tag having the tag design. The one or more equations can be generated to convert a resonance layer, a characteristic layer, and/or other layers of a tag. For example, the tags can include a first tag in which a resonance layer is designed to have a resonant structure (e.g., square resonant structure), and the one or more equations can correspondingly include a first set of equations that convert (i.e., equate) the resonant structure of the resonance layer of the first tag to a resonant circuit (i.e., LC circuit, where "L" represents an inductor and "C" represents a capacitor, in which an infinite number of inductors and capacitors may be used to serve as equivalent response variables). In this case, the magnitude of the inductive reactance and the magnitude of the capacitance associated with design of the resonant structure in the resonance layer can be utilized to determine a simulated resonant frequency and a simulated tag response of the tag to a detection signal.

When the first tag includes a characteristic layer in addition to the resonance layer, the one or more equations can further include a second set of equations to determine the modification made by the characteristic layer to the target response (generated by the resonance layer in response to the detection signal). Optionally, one or more equations for designing a tag (i.e., a tag design) can be stored in a corresponding tag design profile, and for the total number of N tags, a total number of N tag design profiles can be stored in a database or ledger for use by subsequent tag manufacturing (e.g., additive manufacturing and/or subtractive manufacturing).

The method 200 can further include: at block 206, retrieving the set of equations that define the tag designs for the tags, to validate each of the tag designs. As discussed above, a tag design for a tag can include parameters associated with the resonance layer and/or the characteristic layer of the tag. The set of equations can be analyzed to determine components of simulated tag responses (including, for example, the aforementioned target response) for the tag designs. In some implementations, a phase, a frequency, and/or an amplitude for each of the simulated tag responses can be determined using the set of equations. For example, the simulated tag responses can include a first simulated tag response for identifying a first tag having a first tag design, and a second simulated tag response for identifying a second tag different from the first tag and having a second tag design. The first simulated tag response can have a first simulated phase, a first simulated frequency, and a first simulated amplitude, and the second simulated tag response can have a second simulated phase, a second simulated frequency, and a second simulated amplitude.

The first simulated phase, the first simulated frequency, and the first simulated amplitude can be utilized to compute a simulated tag ID for the first tag design. The second simulated phase, the second simulated frequency, and the second simulated amplitude can be utilized to compute a simulated tag ID for the second tag design. Based on the simulated tag ID for the first tag design and the simulated tag ID for the second tag design, the tag designs can be validated. If the simulated tag ID for the first tag design is the same as the simulated tag ID for the second tag design, it's determined that one of the first tag design and the second tag design is invalidated because of the repeated tag IDs. After being invalidated, the tag design profile storing one or more equations for designing a tag having the first tag design (or the second tag design) can be removed from the database or ledger. If the simulated tag ID for the first tag design is different from the simulated tag ID for the second tag design as well as simulated tag ID(s) for other tag designs, it's determined that the first tag design validated because of its uniqueness. After being validated, the tag design profile storing one or more equations for designing a tag having the first tag design can be labelled as "validated", for subsequent manufacturing.

Optionally, the first simulated phase, the first simulated frequency, and the first simulated amplitude can be utilized to derive additional components, such as a first simulated group-delay and a first simulated phase-delay of the first simulated tag response. A plurality of the first simulated phase, the first simulated frequency, the first simulated amplitude, the first simulated group-delay, and the first simulated phase-delay can be utilized to compute the simulated tag ID, to validate the first tag design after comparison to simulated tag IDs of the remaining of tag designs in the total number of N tag designs.

The method 200 can further include: at block 208, determining whether the total number of validated tag designs satisfies the total number of required tags identified at block 202. If it's determined that the total number of validated tag designs is lower than the total number of required tags, the method 200 continues from block 208 to block 204, where the set of equations are updated (e.g., one or more additional equations are added) and validated to create more tag designs that meet the need of the required tags. For example, if there are three items in the inventory system to be tracked and the set of equations are determined at block 210 to include only: a first validated tag design for a first tag having a square resonant structure and a first characteristic layer, and a second validated tag design for a second tag having the square resonant and a second characteristic layer different from the first characteristic layer, the method 200 can determine, at block 208, that two validated tag designs are not enough to track the three items so that the method 200 shall proceed to block 204 where the set of equations are updated (or an additional set of equations are generated) to generate and validate a third tag design for a third tag. In this example, the third tag can include the square resonant structure and a third characteristic layer different from the first and second characteristic layers. In some implementations, blocks 204~208 may be repeated until the total number of validated tag designs meets or exceeds the total number of required tags.

The method 200 can further include: at block 210, printing the tags using the validated tag designs in a predetermined order if it's determined that the total number of validated tag designs satisfies the total number of required tags. For example, the method 200 may determine that for an inventory system that requires three tags uniquely identifying and tracking three items, three tag designs are validated at block 206 so that it's determined at block 208 that the total number (i.e., three) of validated tag designs satisfies the total number (i.e., three) of required tags. In this example, the three tag designs can have a first validated tag design, a second validated tag design, and a third validated tag design. The tag design profiles for the first validated tag design, the second validated tag design, and the third validated tag design can be sent to a printing device for printing in a predetermined order, so that the printing device can manufacture a first tag having the first validated tag design, a second tag having the second validated tag design, and a third tag having the validated tag design in the predetermined order. The predetermined order can be configured based on degree of similarity between the validated tag designs, including material, geometric dimensions, shape of the resonance layer and/or material, geometric dimensions, shape of the characteristic layer.

Figure 3:
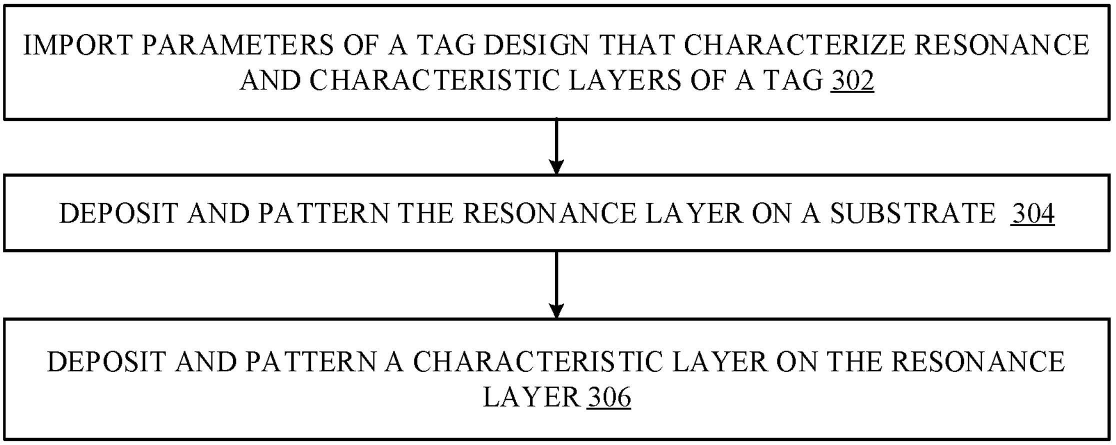
FIG. 3 illustrates an example method of fabricating a passive identification tag, according to one or more embodiments described herein.

FIG. 3 illustrates an example method 300 of fabricating a passive identification tag, according to one or more embodiments described herein. As shown in FIG. 3, the method 300 can include, at block 302, importing parameters of a tag design that characterizes a resonance layer and a characteristic layer of a passive identification tag. For example, the parameters of the tag design can include a predetermined pattern of a conductive material forming the resonance layer, a conductivity thereof, and a thickness thereof. Similarly, the parameters of the tag design can include a pattern of a dielectric or non-conductive material forming the characteristic layer, a conductivity thereof, and a thickness thereof.

The method 300 can further include, at block 304, depositing and patterning, based on the parameters of the tag design, the resonance layer on a substrate. For example, the resonance layer can be formed on the substrate by depositing a uniform (e.g., substantially planar) layer of conductive material on the substrate, and by further patterning the deposited uniform layer to generate the aforementioned resonant structure. The uniform layer of conductor material may be deposited using a suitable deposition process such as plating, sputtering, or metallic printing. One or more portions of the resonance layer may be removed by using a subtractive manufacturing process, such as laser abrasion, garnet abrasion, or die cutting, to generate a resonant structure that generates a tag response in response to a detection signal that interrogates the passive identification tag.

In some other implementations, the resonance layer can be formed on the substrate by disposing a predetermined pattern of conductive material on the substrate via an additive manufacturing process, where the additive manufacturing process can be a metallic printing process. For example, the metallic printing process may be applied to dispose a plurality of resonant sub-structures, made of a conductive material, directly on the substrate. In some other implementations, the resonance layer can be formed via a combination of a subtractive manufacturing process and an additive manufacturing process.

The method 300 can further include, at block 306, depositing and patterning, based on the parameters of the tag design, the characteristic layer on the resonance layer. The characteristic layer can be formed on the resonance layer via an additive manufacturing process, using for example a piezoelectric inkjet printer, a thermal inkjet printer, and/or an aerosol jet printer. For example, the characteristic layer can be formed to selectively cover portions of the resonance layer with a uniform or varied thickness to modify the tag response generated by the resonant structure of the resonance layer. In some embodiments, the characteristic layer can be formed by depositing a uniform (e.g., substantially planar) layer of dielectric (or non-conductive) material on the resonance layer, and by further patterning the deposited uniform layer of dielectric (or non-conductive) material to generate the dielectric structure. The depositing may be a process implemented via plating, sputtering, or printing. The patterning may include a selective removing process where various portions of the uniform layer of dielectric material are removed via a subtractive manufacturing process, such as laser abrasion, garnet abrasion, or die cutting.

FIG. 4 illustrates an example method 400 of fabricating resonance and characteristic layers for a passive identification tag, according to one or more embodiments described herein. As shown in FIG. 4, the method 400 can include, at block 402, depositing, based on parameters of a tag design, a predetermined pattern of a resonant structure of a resonance layer on a substrate using an additive manufacturing process. The method 400 can further include, at block 404, depositing, based on the parameters of the tag design, a characteristic layer on the resonance layer using a subtractive manufacturing process.

FIG. 5 illustrates another example method of fabricating resonance and characteristic layers for a passive identification tag, according to one or more embodiments described herein. As shown in FIG. 5, the method 500 can include, at block 502, depositing, based on parameters of a tag design, a resonance layer on a substrate using a subtractive manufacturing process. In the subtractive manufacturing process, a substantially planar layer of metallic material can be formed on the substrate and one or more portions of the substantially planar layer can be removed ("patterned") to form a resonant structure of the resonance layer. The method 500 can further include, at block 504, depositing, based on the parameters of the tag design, a characteristic layer on the resonance layer using an additive manufacturing process. For example, a dielectric structure of a desired pattern and of a dielectric material may be disposed on the resonance layer to modify the tag response received from the passive identification tag in response to a detection signal.

FIG. 6 illustrates an example system of fabricating a passive identification tag, according to one or more embodiments described herein. As shown in FIG. 6, the system 600 can include a first printing device (not shown) having a first printing head (not shown, which can be configured for plating, sputtering, 3D printing, etc.) to deposit a resonance layer 603 on a substrate 601. Optionally or additionally, the system 600 can further include a cutting device having a cutting head 604 (e.g., diamond, laser) to perform a subtractive manufacturing process, in which a portion of the resonance layer 603 is removed by the cutting head to transform ("pattern") the resonance layer 603 (which can be, for example, substantially planar) into a patterned resonance layer. For example, as shown in FIG. 6, the cutting head 604 can pattern the resonance layer 603 into a patterned resonance layer that includes two concentric square loops. Optionally or additionally, the system 600 can further include a second printing head 602 to deposit one or more dielectric sub-structures 605 on the resonance layer. For example, as shown in FIG. 6, the second printing head 602 can deposit a single dielectric sub-structure 605 on the resonance layer, where the single dielectric sub-structure 605 cover a portion of a top surface of the patterned resonance layer (e.g., the concentric square loops).

The second printing head 602 can be configured to have different poses (i.e., position and orientation) in a three-dimensional space having six degrees of freedom (i.e., three translation components for the position of the second printing head 602 and three rotation components for the orientation of the second printing head 602), and flexibly switch between the different poses to deposit the one or more dielectric sub-structures 605. Such flexibility can allow the second printing head 602 to dispose the one or more dielectric sub-structures 605 to have desired geometric dimensions and on desired locations with respect to the resonance layer 603. The one or more dielectric sub-structures 605 can be different from each other or be substantially the same as each other, where the one or more dielectric sub-structures 605 together form the aforementioned characteristic layer. Optionally, the second printing head 602 can be the same as or different from the aforementioned first printing head. When the second printing head 602 is the same as the first printing head, after the second printing head 602 is configured to deposit the resonance layer 603 made of, e.g., a metallic material, a cleaning process needs to be performed (or a material feeding process needs to be adjusted) prior to the second printing head 602 being configured to deposit the one or more dielectric sub-structures 605 (which can be made of a dielectric material).

Figure 8:
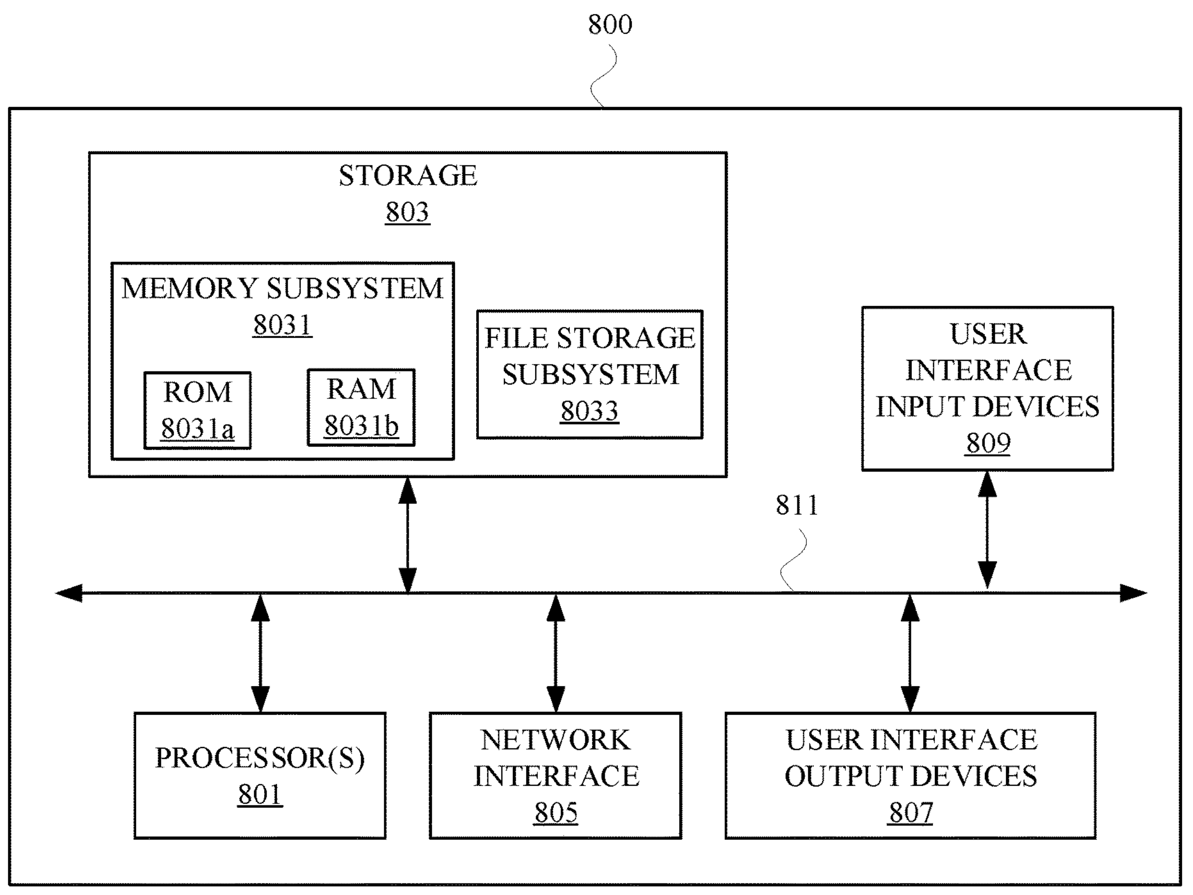
FIG. 8 illustrates an example computing device, according to one or more embodiments described herein.

Alternatively, the second printing head 602 can use the second printing head 602 to deposit a layer of dielectric material on the resonance layer 603, and the cutting head 604 (or a different cutting head of a different type) can be positioned to pattern the layer of dielectric material to form the characteristic layer (e.g., by forming one or more dielectric sub-structures 605). The cutting head 604 (or the different cutting head) can be configured to have different poses (i.e., position and orientation) in the three-dimensional space having six degrees of freedom, including three translation components (x, y, z coordinates) for the position, and three rotation components (roll, pitch, yaw) for the orientation. The cutting head 604 (or the different cutting head) can flexibly switch between the different poses of the cutting head 604 (or the different cutting head) to remove one or more portions of the layer of dielectric material. Such flexibility can allow the cutting head 604 to efficiently pattern the layer of dielectric materials into the one or more dielectric sub-structures 605, to form the characteristic layer or a part thereof. FIG. 8 illustrates an example architecture of a computing device 800, for practicing certain aspects of the present disclosure, in accordance with various implementations. In some implementations, one or more of the transmitting system, receiving system, and transceiving system may comprise one or more hardware or software components of the example computing device 800.

Computing device 800 can include at least one processor 801 which communicates with a number of peripheral devices via bus subsystem 811. These peripheral devices may include a storage 803, including, for example, a memory subsystem 8031 and a file storage subsystem 8033 that stores one or more tag IDs, user interface input devices 809, user interface output devices 807, and a network interface subsystem 805. The input and output devices allow user interaction with computing device 800. Network interface subsystem 805 provides an interface to outside networks and is coupled to corresponding interface devices in other computing devices.

User interface input devices 809 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 800 or onto a communication network.

User interface output devices 807 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 800 to the user or to another machine or computing device.

Storage 803 stores programming and data constructs that provide the functionality of some or all of the modules described herein. For example, the storage 803 may include the logic (e.g., the aforementioned tag identification logic) to perform selected aspects of one or more of the methods described herein, and/or to implement various components depicted herein.

These software modules are generally executed by processor 801 alone or in combination with other processors. Memory subsystem 8031 used in the storage 803 can include a number of memories including a read only memory ("ROM") 8031*a* in which fixed instructions are stored, and a main random access memory ("RAM") 8031*b* for storage of instructions and data during program execution. The file storage subsystem 8033 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 8033 in the storage 803, or in other machines accessible by the processor(s) 801.

Bus subsystem 811 provides a mechanism for letting the various components and subsystems of computing device 800 communicate with each other as intended. Although bus subsystem 811 is shown schematically as a single bus, alternative implementations of the bus subsystem may use multiple buses.

Computing device 800 can be of varying types including a workstation, server, computing cluster, blade server, server farm, or any other data processing system or computing device. Due to the ever-changing nature of computers and networks, the description of computing device 800 depicted in FIG. 8 is intended only as a specific example for purposes of illustrating some implementations. Many other configurations of computing device 800 are possible having more or fewer components than the computing device depicted in FIG. 8.

Some implementations of the computing device 800 may include a system having one or more user devices, each with one or more processors and memory operably coupled with the one or more processors, where the memory of the one or more user devices store instructions that, in response to execution of the instructions by the one or more processors of the one or more user devices, cause the one or more processors to perform any of the methods described herein. Some implementations also include at least one non-transitory computer-readable medium including instructions that, in response to execution of the instructions by one or more processors, cause the one or more processors to perform any of the methods described herein.

The present disclosure has been described in particular detail with respect to possible implementations or embodiments. Those of skill in the art will appreciate that the disclosure may be practised in other implementations. First, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements, or entirely in software elements. Also, the particular division of functionality between the various system components described herein is merely exemplary. Functions performed by a single system component may instead be performed by multiple components, and functions performed by multiple components may instead be performed by a single component. In various implementations, the present disclosure can be practiced as a system or a method for performing the above-described techniques, either singly or in any combination. The appearances of the phrase "in some implementations" in various paragraphs of the specification are not necessarily all referring to the same implementations.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "process" or "compute" or "calculate" or "determine" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure can be embodied in software, firmware and/or hardware, and when embodied in software, can be downloaded to reside on and be operated from different platforms used by a variety of operating systems.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present disclosure is not described with reference to any particular programming language. It will be appreciated that a variety of programming languages may be used to implement the teachings of the present disclosure as described herein, and any references above to specific languages are provided for disclosure of enablement and best mode of the present disclosure.

While the disclosure has been described with respect to a limited number of implementations, those skilled in the art, having benefit of the above description, will appreciate that other implementations may be devised which do not depart from the scope of the present disclosure as described herein. In addition, it should be noted that the language used in the specification has been principally selected for readability and instructional purposes, and may not have been selected to delineate or circumscribe the inventive subject matter. Accordingly, the descriptions of the present disclosure are intended to be illustrative, but not limiting, of the scope of the disclosure, which is set forth in the claims.

What is claimed is:

1. A method of fabricating a passive identification tag, the method comprising:

determining a pattern for a resonant structure of a resonance layer of the passive identification tag;

determining a pattern for a characteristic structure of a characteristic layer to be disposed with respect to the resonance layer;

generating, based on the pattern for the resonant structure and using a first material, the resonant structure on a substrate to form the resonance layer, wherein the resonant structure generates a tag response in response to receiving an incoming detection signal; and generating, based on the pattern for the characteristic structure, the characteristic structure over the resonance layer and/or on the substrate to form the characteristic layer, wherein the characteristic structure modifies the tag response so that the passive identification tag transmits and/or reflects a modified tag response in response to receiving the incoming detection signal.

2. The method of claim 1, wherein determining the pattern for the resonant structure comprises validating the pattern for the resonant structure, and wherein validating the pattern for the resonant structure comprises:

determining a first set of equations that equate the resonant structure to a first circuit, retrieving the first set of equations to determine, based on the first circuit, an original simulation tag response of the resonant structure responsive to the incoming detection signal, and validating, based on the original simulation tag response, the pattern for the resonant structure.

3. The method of claim 1, wherein determining the pattern for the characteristic structure comprises validating the pattern for the characteristic structure, and wherein validating the pattern for the characteristic structure comprises:

determining a second set of equations that equate the resonant structure and the characteristic structure to a second circuit, retrieving the second set of equations to determine, based on the second circuit, a modified simulation tag response of the passive identification tag in response to the incoming detection signal, determining a tag identification (ID) based on the modified tag response responsive to the incoming detection signal, and validating, based on the tag ID, the pattern for the characteristic structure, wherein the characteristic structure is a dielectric structure, a conductive structure, or a semiconductor structure.

4. The method of claim 1, wherein generating the resonant structure on the substrate comprises:

forming a layer of the first material on the substrate, and patterning the layer of the first material to form the resonant structure using a subtractive manufacturing device.

5. The method of claim 4, wherein the subtractive manufacturing device includes one or more of: a diamond cutting device, a router, a blade, a mechanical scraper, a sand drill, an electric arc, a plasma cutting device, a laser cutting device, a water-jet cutting device, an electrical discharge machining (EDM) device, and a die cutting device.

6. The method of claim 1, wherein generating the characteristic structure on or in-between the resonance layer comprises:

selectively depositing a dielectric material, a conductive material, and/or a semiconductor material with respect to the resonance layer, based on the determined pattern for the characteristic structure and using an additive manufacturing device.

7. The method of claim 6, wherein the additive manufacturing device includes one or more of: a piezoelectric inkjet printer, a thermal inkjet printer, and an aerosol jet printer, syringe dispense, nozzle dispense, transfer printing, or other printing method.

8. The method of claim 1, wherein the resonance layer and/or the characteristic layer are formed using a combination of an additive manufacturing device and a subtractive manufacturing device.

9. The method of claim 1, wherein the resonance layer includes a connection structure that connects the resonance layer to one or more external sensors for sensing at least one environmental parameter of an environment to which the passive identification tag is exposed.

10. The method of claim 1, wherein the first material is one or more of: copper, graphene, silver, carbon black, graphite, carbon nanotube, a metallic alloy, Nickel, Au, Pd, Pt, aluminium, or any combination thereof.

11. The method of claim 1, wherein the characteristic layer is made of one or more of PET, PU HDPE, Polyimide, Polyamide, epoxy, acrylate, methacrylate, latex, carbon black, silver, gold, aluminium, Barium Titanate, ZrO2, HfO2, PZT, PbO, PMMA, SiO2, ZnO, ITO, IGZO, TiO2, Al2O3, ZTO, ZIO, Ta2O5, GaAs, amorphous silicon, laser crystalized silicon, or any combination thereof including different ratios of involved atoms and dopants to abase material.

12. The method of claim 1, further comprising:

generating a reference structure made of a second material over the substrate, wherein the reference structure generates a reference signal in response to receiving the incoming detection signal, and wherein the second material is the same as or different from the first material.

13. A system, comprising:

a computing device having one or more processors and a memory, wherein the one or more processors determine a pattern for a resonant structure of a resonance layer of a passive identification tag and a pattern for a characteristic structure of a characteristic layer to be disposed with respect to the resonance layer;

a printing device having an additive manufacturing device and/or a subtractive manufacturing device, wherein the printing device generates, based on the pattern for the resonant structure and using a conductive material, the resonant structure on a substrate to form the resonance layer, and wherein the printing device generates, based on the pattern for the characteristic structure, the characteristic structure with respect to the resonance layer to form the characteristic layer.

14. The system of claim 13, wherein prior to generating the resonant structure and the characteristic structure, the one or more processors:

determine a first set of equations that equate the resonant structure to a first circuit, and determine, based on the first circuit, an original tag response of the passive identification tag generated by the resonant structure responsive to an incoming detection signal.

15. The system of claim 14, wherein the one or more processors further:

determine a second set of equations that equate the resonant structure and the characteristic structure to a second circuit, modify, based on the second circuit, the original tag response generated by the resonant structure, to generate a modified tag response for the passive identification tag in response to the incoming detection signal, determine a tag identification (ID) based on the modified tag response responsive to the incoming detection signal, and validating, based on the tag ID, the resonant structure and the characteristic structure.

16. The system of claim 13, wherein:

the printing device further generates a protection layer on the characteristic layer, wherein the protection layer extends over side walls of the characteristic layer and side walls of the resonance layer to seal the passive identification tag.

17. The system of claim 13, wherein the resonance layer is made of one or more of copper, Graphene, silver, aluminium, graphite, a metallic alloy, nickel, Au, Pd, Pt, carbon black, conductive nanoparticles, carbon nanotubes, or any combination thereof.

18. The system of claim 13, wherein the characteristic layer is made of one or more of PET, PU HDPE, Polyimide, Polyamide, epoxy, acrylate, methacrylate, latex, carbon black, silver, gold, aluminum, Barium Titanate, ZrO2, HfO2, PZT, PbO, PMMA, SiO2, ZnO, ITO, IGZO, TiO2, Al2O3, ZTO, ZIO, Ta2O5, GaAs, amorphous silicon, laser crystalized silicon, or any combination thereof including different ratios of involved atoms and dopants to a base material.

19. The system of claim 13, wherein:

the subtractive manufacturing device includes one or more of: a diamond cutting device, a laser cutting device, a water-jet cutting device, an electrical discharge machining (EDM) device, and a die cutting device; and the additive manufacturing device includes one or more of: a piezoelectric inkjet printer, a thermal inkjet printer, and an aerosol jet printer.

20. A method of fabricating a tag, the method comprising:

determining a pattern for a resonant structure of a resonance layer of the tag;

determining a pattern for a characteristic structure of a characteristic layer to be disposed on the resonance layer;

generating, based on the pattern for the resonant structure and using a conductive material, the resonant structure on a substrate to form the resonance layer, wherein the resonant structure generates a tag response in response to receiving an incoming detection signal; and generating, based on the pattern for the characteristic structure and using a dielectric material, the characteristic structure on the resonance layer to form the characteristic layer, wherein the dielectric structure modifies the tag response so that the tag generates a modified tag response in response to receiving the incoming detection signal.

* * * * *